United States Patent
Suzuki et al.

(10) Patent No.: US 9,885,836 B2
(45) Date of Patent: Feb. 6, 2018

(54) OPTICAL CONNECTOR, CABLE, AND OPTICAL COMMUNICATION DEVICE

(71) Applicant: SONY CORPORATION, Tokyo (JP)

(72) Inventors: Kazuyoshi Suzuki, Tokyo (JP);
Kazumoto Kondo, Kanagawa (JP);
Kazuaki Toba, Kanagawa (JP);
Yasuhisa Nakajima, Kanagawa (JP);
Satoshi Miyazaki, Kanagawa (JP);
Masanari Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/116,043

(22) PCT Filed: Jan. 9, 2015

(86) PCT No.: PCT/JP2015/050493
§ 371 (c)(1),
(2) Date: Aug. 2, 2016

(87) PCT Pub. No.: WO2015/133166
PCT Pub. Date: Sep. 11, 2015

(65) Prior Publication Data
US 2017/0184794 A1    Jun. 29, 2017

(30) Foreign Application Priority Data
Mar. 6, 2014  (JP) .................. 2014-043736

(51) Int. Cl.
*G02B 6/32* (2006.01)
*G02B 6/42* (2006.01)
(Continued)

(52) U.S. Cl.
CPC ............. *G02B 6/32* (2013.01); *G02B 6/4206* (2013.01); *G02B 6/4292* (2013.01); *G02B 7/10* (2013.01);
(Continued)

(58) Field of Classification Search
None
See application file for complete search history.

(56) References Cited

U.S. PATENT DOCUMENTS

| 4,636,030 A | 1/1987 | Carter et al. |
| 4,732,452 A | 3/1988 | Carter |
| | (Continued) | |

FOREIGN PATENT DOCUMENTS

| EP | 0125829 A2 | 5/1984 |
| JP | 59-211012 | 11/1984 |
| | (Continued) | |

OTHER PUBLICATIONS

Jun. 8, 2017, CN communication issued for related CN application No. 201580011255.0.
(Continued)

*Primary Examiner* — Michelle R Connelly
(74) *Attorney, Agent, or Firm* — Paratus Law Group, PLLC

(57) ABSTRACT

A collimator lens 311 emits by converting a light signal from an optical fiber cable 20 to a collimated light, for example. The collimator lens 311 is retained in a plug housing 315 coupled to a reception side optical connector of the light signal. When the plug housing 315 is not coupled to the reception side optical connector, the pressing portion 313a sets the position of the collimator lens 311 at a position at which the emitted light signal has a predetermined divergence angle. When the optical connectors of the transmission side and the reception side are not connected, the light signal emitted from the optical connector of the transmission side is dispersed, and therefore emission of the light signal is prevented from giving a bad influence to a visual perception function or the like.

7 Claims, 10 Drawing Sheets

(51) Int. Cl.
*G02B 7/10* (2006.01)
*G02B 6/38* (2006.01)

(52) U.S. Cl.
CPC .... *G02B 6/3849* (2013.01); *G02B 2006/4297* (2013.01)

(56) References Cited

U.S. PATENT DOCUMENTS

| | | | | |
|---|---|---|---|---|
| 5,351,330 | A | * | 9/1994 | Jongewaard ......... G02B 6/4204 385/90 |
| 5,659,432 | A | * | 8/1997 | Takashima ......... G06K 7/10643 359/652 |
| 6,374,012 | B1 | * | 4/2002 | Bergmann ............... G02B 6/32 359/652 |
| 8,393,802 | B2 | * | 3/2013 | Stanley ................ G02B 6/3866 385/134 |
| 9,557,489 | B2 | * | 1/2017 | Martelius ............... G02B 6/262 |
| 2005/0175298 | A1 | * | 8/2005 | Matta ................... G02B 6/4206 385/93 |
| 2013/0071063 | A1 | * | 3/2013 | Aoki ...................... G02B 6/327 385/33 |
| 2014/0016897 | A1 | * | 1/2014 | Glenn ..................... G02B 6/32 385/33 |

FOREIGN PATENT DOCUMENTS

| | | |
|---|---|---|
| JP | 2000-147324 | 5/2000 |
| JP | 2000-147333 | 5/2000 |
| JP | 2000147324 A * | 5/2000 |
| WO | WO2006/068128 A1 | 6/2006 |

OTHER PUBLICATIONS

Jul. 11, 2017, EP communication issued for related EP application No. 15759019.1.

* cited by examiner

OPTICAL CONNECTOR, CABLE, AND OPTICAL COMMUNICATION DEVICE

CROSS REFERENCE TO PRIOR APPLICATION

This application is a National Stage Patent Application of PCT International Patent Application No. PCT/JP2015/050493 (filed on Jan. 9, 2015) under 35 U.S.C. § 371, which claims priority to Japanese Patent Application No. 2014-043736 (filed on Mar. 6, 2014), which are all hereby incorporated by reference in their entirety.

TECHNICAL FIELD

This technology relates to an optical connector, a cable, and an optical communication device, which prevent an emitted light signal from giving a bad influence to a visual perception function or the like.

BACKGROUND ART

In the past, in optical communication that uses laser light, optical fiber cables are connected by using an optical connector, for example. In a widely known optical connector, a lens for forming a light signal communicated between a plug and a receptacle into a collimated light is provided in one of the plug side and the receptacle side, and a lens for collecting the collimated light is provided in the other. As described above, if the communication is performed between the plug and the receptacle by using the collimated light, optical communication can be performed without highly precisely positioning the end surface of the optical fiber cable at a predetermined interval to face light detection or the like each other, and the optical connector can be provided inexpensively.

Also, in Patent Literature 1, a movable shutter is provided in an end portion of an optical fiber cable. This shutter covers an end surface (an emission surface) of a light signal emission side of the optical fiber cable at a closed position. Thus, the emission surface can be protected from flaw, taint, and the like, and entrance of light into the optical fiber cable or the like can be blocked. Further, the shutter covers the emission surface of the optical fiber cable, and thereby the collimated light emitted from the emission surface of the optical fiber cable is prevented from entering into an eyeball of a nearby person and giving a bad influence to a visual perception function or the like.

CITATION LIST

Patent Literature

Patent Literature 1: JP 2000-147333A

SUMMARY OF INVENTION

Technical Problem

In the meantime, a shutter which is a member that is unnecessary in optical communication becomes necessary, when providing a movable shutter at the end portion of the optical fiber cable.

Thus, in this technology, a purpose is to provide an optical connector, a cable, and an optical communication device, which can prevent emission of a light signal that gives a bad influence to a visual perception function or the like.

Solution to Problem

According to a first aspect of the present technology, there is provided an optical connector including a collimator lens for emitting by converting a light signal from a light transmission path or a light source to a collimated light, a housing configured to retain the collimator lens and be coupled to a reception side optical connector of the light signal, and a lens drive unit configured to drive the collimator lens in such a manner that a light signal emitted via the collimator lens has a predetermined divergence angle, when the housing is not coupled to the reception side optical connector.

In this technology, a collimator lens for converting a light signal to a collimated light and emitting the collimated light is retained in a housing that is to be coupled to a reception side optical connector of the light signal, and when the housing is not coupled to the reception side optical connector, the collimator lens is driven by a lens drive unit in such a manner that the light signal emitted via the collimator lens has a predetermined divergence angle. The lens drive unit includes a lens retention portion that can move in a state that retains the collimator lens, and a pressing portion that presses the lens retention portion in a direction of a position at which the light signal emitted via the collimator lens has a divergence angle. When the reception side optical connector is coupled to a predetermined position, the lens retention portion moves to a position at which the light signal emitted via the collimator lens becomes a collimated light; for example, the lens retention portion turns about a center at an axis provided at a side end side of the collimator lens in an optical axis direction of the collimator lens or in an orthogonal direction to the optical axis of the collimator lens. Also, the lens drive unit changes a focal length of the collimator lens in such a manner that the light signal emitted via the collimator lens has the divergence angle. Further, a predetermined divergence angle is set to an angle at which the light amount of a predetermined region at a position away from the collimator lens by a predetermined distance is equal to or smaller than a preset light amount.

According to a second aspect of the present technology, there is provided a cable including a collimator lens for emitting by converting a light signal from an end surface of an optical fiber cable to a collimated light, a housing configured to retain the optical fiber cable and the collimator lens and coupled to a reception side optical connector of the light signal, and a lens drive unit configured to drive the collimator lens in such a manner that a light signal emitted via the collimator lens has a predetermined divergence angle, when the housing is not coupled to the reception side optical connector.

According to a third aspect of the present technology, there is provided a light communication device including a light signal output unit, a collimator lens for emitting by converting a light signal from the light signal output unit to a collimated light, a housing configured to retain the collimator lens and be coupled to a reception side optical connector of the light signal, and a lens drive unit configured to drive the collimator lens in such a manner that a light signal emitted via the collimator lens has a predetermined divergence angle, when the housing is not coupled to the reception side optical connector.

Advantageous Effects of Invention

According to this technology, the collimator lens for converting the light signal from the light transmission path or the light source to the collimated light and emitting the collimated light is retained in the housing that is coupled to the reception side optical connector of the light signal. Also, when the housing is not coupled to the reception side optical connector, the lens drive unit drives the collimator lens in such a manner that the light signal emitted via the collimator lens has a predetermined divergence angle. Hence, when the optical connectors of the transmission side and the reception side are not connected to each other, the light signal emitted from the optical connector of the transmission side is dispersed, and therefore emission of the light signal that gives a bad influence to the visual perception function or the like is prevented. Note that the effects described in the present specification are just examples and are not limitative, and there may be additional effects.

DESCRIPTION OF EMBODIMENT(S)

Figure 1:
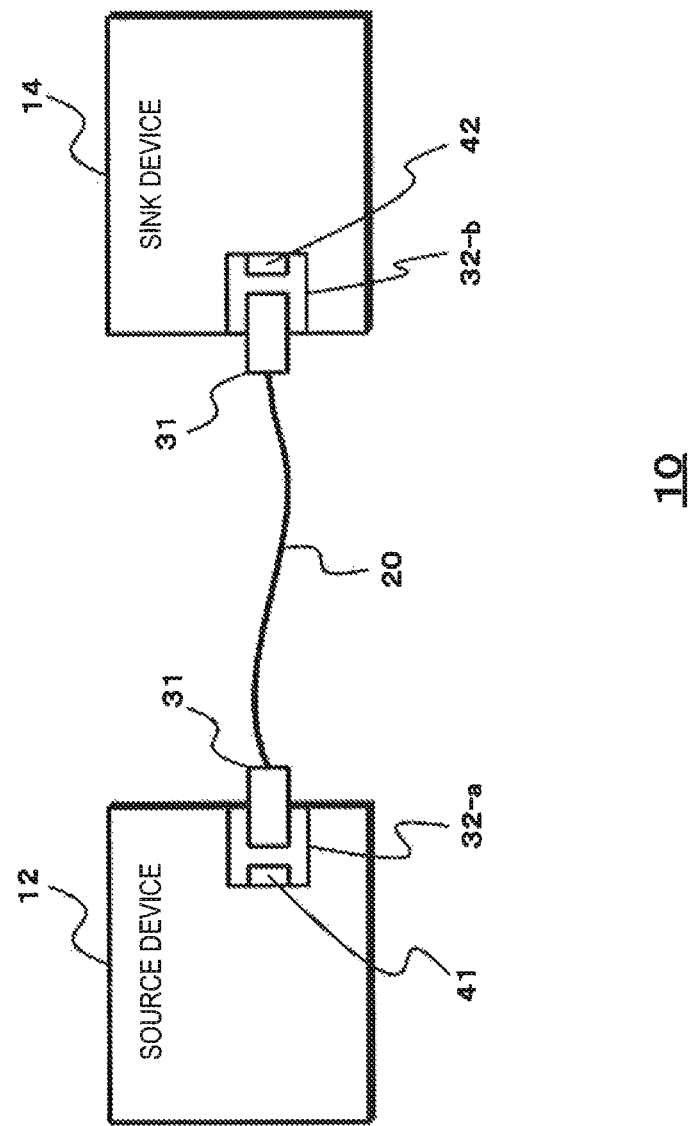
FIG. 1 is a diagram illustrating a configuration of an optical communication system.

In the following, a mode for carrying out the present technology will be described. Note that description will be made in the following order.
1. Configuration of Optical Communication System
2. Configuration and Operation of Optical Connector
3. First Embodiment of Optical Connector
3-1. Schematic Configuration of First Embodiment
3-2. Operation of First Embodiment
4. Second Embodiment of Optical Connector
4-1. Schematic Configuration of Second Embodiment
4-2. Operation of Second Embodiment
5. Another Configuration and Operation of Optical Connector
<1. Configuration of Optical Communication System>
FIG. 1 illustrates a configuration of an optical communication system that uses an optical connector of the present technology. In an optical communication system 10, a source device 12 which is an information transmission side and a sink device 14 which is an information reception side are connected via a light transmission path, for example an optical fiber cable 20.

The source device 12 is a device that can output video and audio content, information of computer data, and the like. For example, the source device 12 is a device such as a set-top box that receives a broadcast program, a delivered program, and the like, a reproduction device that reproduces video and audio content recorded in a recording medium, a server that stores various content, information of computer data, and the like, and an information transmitter device.

The sink device 14 receives information output from the source device 12, and is a device that performs a process to present the received information to a user and a process to record the received information in a recording medium or the like. For example, the sink device 14 is a device such as a video display device, an audio output device, a recording device, or an information receiver device.

In the optical communication system 10, an optical connector is used to connect the optical fiber cable 20 to the source device 12 and the sink device 14. The optical connector is configured with a plug 31 and a receptacle 32, and the plug 31 is attached to the receptacle 32 in an insertable and removable manner.

The plug 31 is provided at both ends of the optical fiber cable 20 for example, and the receptacle 32 is provided in each of the source device 12 and the sink device 14 for example. A light source 41 that emits laser light is provided in a receptacle 32-$a$ of the source device 12, and a light detection unit 42 that converts a light signal to an electrical signal is provided in a receptacle 32-$b$ of the sink device 14.

Here, as illustrated in FIG. 1, the plug 31 provided at one end of the optical fiber cable 20 is coupled to the receptacle 32-$a$ of the source device 12, and the plug 31 provided at another end of the optical fiber cable 20 is coupled to the receptacle 32-$b$ of the sink device 14. Further, the receptacle 32-$a$ of the source device 12 emits a laser light modulated in accordance with the information to transmit as a light signal from the light source 41. As described above, if the transmitted information is transmitted as the light signal, communication can be performed between the source device 12 and the sink device 14 via the optical fiber cable 20, by the receptacle 32-$b$ of the sink device 14 that collects the light signal to the light detection unit 42 and generates the electrical signal according to the light signal. Note that the optical communication system 10 may include a configuration that transmits information relevant to the sink device 14 or the like to the source device via an optical fiber cable.
<2. Configuration and Operation of Optical Connector>
The optical connector converts the light signal from the optical fiber cable 20 and the light source 41 to the collimated light by the collimator lens and emits the collimated light, in the transmission side optical connector (the plug or the receptacle). Also, the housing of the transmission side connector coupled to the reception side optical connector of the light signal retains the collimator lens in a movable manner. Further, when the housing of the transmission side connector is not coupled to the reception side optical connector, the lens drive unit drives the collimator lens in such a manner that the light signal emitted via the collimator lens has a predetermined divergence angle. Also, when the housing of the transmission side connector is coupled to the reception side optical connector, the lens drive unit drives the collimator lens in such a manner that the light signal emitted via the collimator lens becomes a collimated light. Note that a position of the collimator lens at which the transmission side optical connector is not coupled to the reception side optical connector and the light signal emitted via the collimator lens has a predetermined divergence angle is an unconnected position. Also, a position of the collimator lens at which the transmission side optical connector is coupled to the reception side optical connector and the light signal emitted via the collimator lens becomes a collimated light is a connected position.

<3. First Embodiment of Optical Connector>
<3-1. Schematic Configuration of First Embodiment>

In the first embodiment of the optical connector, a case in which the collimator lens provided in the plug that emits the light signal is movable in the emission direction of the light signal will be described.

Figure 2:
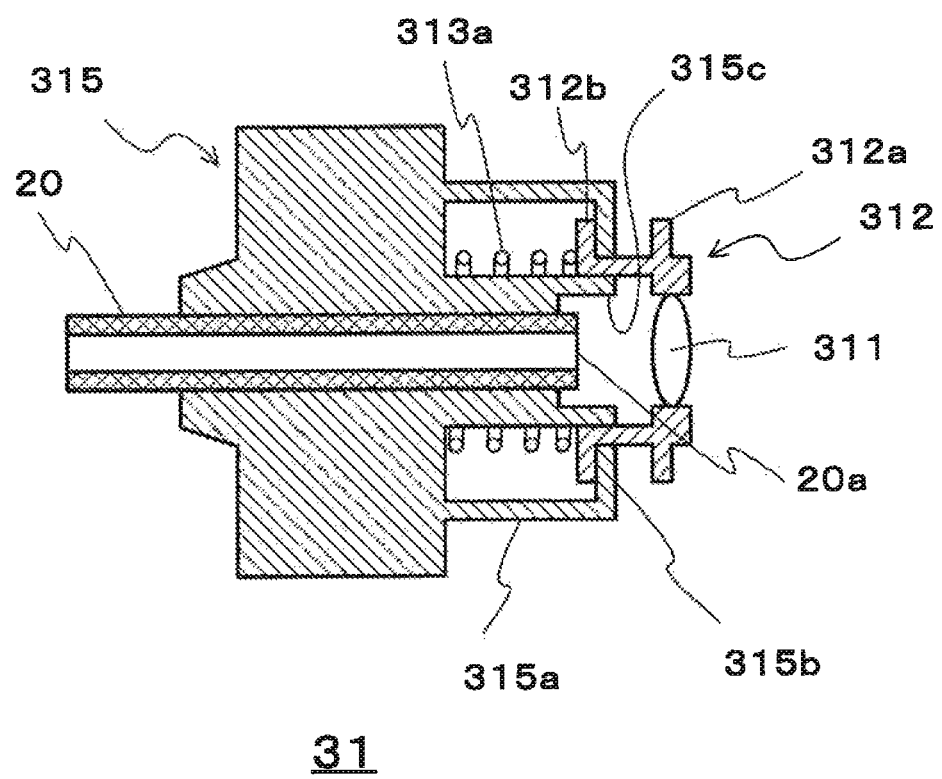
FIG. 2 is a diagram illustrating a schematic configuration of a plug that emits a light signal.
Figure 3:
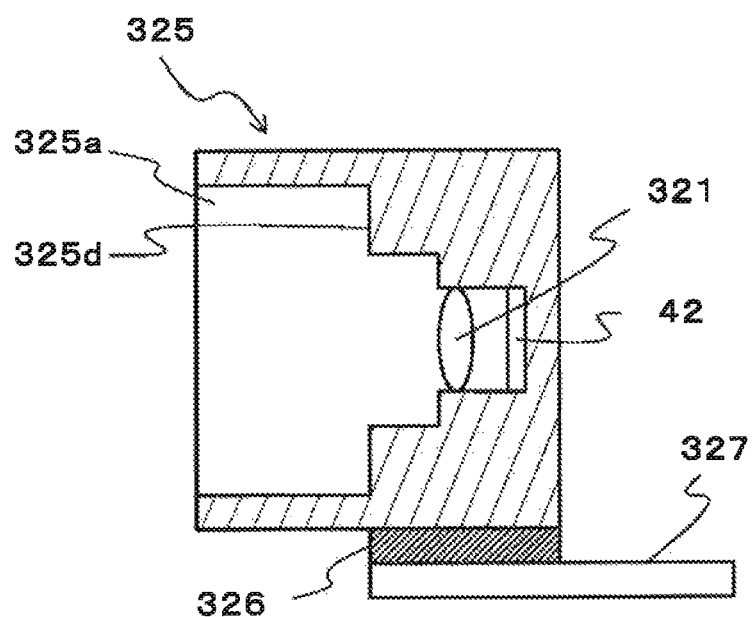
FIG. 3 is a diagram illustrating a schematic configuration of a receptacle into which a light signal enters.

FIG. 2 illustrates a schematic configuration of the plug that emits the light signal. Also, FIG. 3 illustrates a schematic configuration of the receptacle into which the light signal enters. Note that, in order to facilitate the understanding of this technology, the below diagrams illustrate the housing, the optical fiber cable, and the like in cross-sectional views.

As illustrated in FIG. 2, a plug (a transmission side optical connector) 31 that emits a light signal includes a collimator lens 311, a lens retention portion 312, a pressing portion 313a, and a plug housing 315.

The collimator lens 311 is provided at an end surface (an emission surface) 20a side of a light signal emission side of the optical fiber cable 20, and converts the light signal emitted from the optical fiber cable 20 to a collimated light.

The lens retention portion 312 retains the collimator lens 311. The lens retention portion 312 has a tube shape for example, and the collimator lens 311 is fixed at one of end portion sides. An engagement portion 312a is formed in one of the end portion sides at which the collimator lens 311 of the lens retention portion 312 is fixed. The engagement portion 312a is formed to protrude from an outside surface of the end portion side, for example. A latch portion 312b is formed in another end portion of the lens retention portion 312. The latch portion 312b is formed to protrude from the outside surface of the end portion.

The pressing portion 313a is configured by using a coil spring or the like for example, and is inserted into a support shaft 315c of the plug housing 315, and is sandwiched between the plug housing 315 and the latch portion 312b of the lens retention portion 312. The pressing portion 313a presses the lens retention portion 312 in an arrow MA direction which is an emission direction of the light signal.

The plug housing 315 retains the optical fiber cable 20, and retains the lens retention portion 312 in a movable manner in the optical axis direction of the light signal. In the plug housing 315, a fitting protrusion portion 315a and a support shaft 315c are provided to protrude on a surface that faces the receptacle 32 when the plug 31 and the receptacle 32 are connected. The fitting protrusion portion 315a has a shape and a size corresponding to a fitting hole of the receptacle 32, and is inserted into the fitting hole of the receptacle 32 at the time of connection with the receptacle 32.

At a distal end of the fitting protrusion portion 315a, a restriction portion 315b is formed to protrude to the inner surface side. The restriction portion 315b latches the latch portion 312b of the lens retention portion 312, and restricts the movement in the emission direction of the lens retention portion 312 that is pressed in the emission direction of the light signal by the pressing portion 313a.

The support shaft 315c is provided inside the fitting protrusion portion 315a, and the pressing portion 313a and the lens retention portion 312 are inserted. The support shaft 315c slidably supports the inserted lens retention portion 312 in the emission direction of the light signal. The optical fiber cable 20 is fixed at the substantially center of the support shaft 315c, which is a position where the emission surface 20a of the optical fiber cable 20 and the collimator lens 311 face each other.

As illustrated in FIG. 3, the receptacle (the reception side optical connector) 32 into which the light signal enters includes a lens 321 and a receptacle housing 325, and a receptacle attachment portion 326 and a receptacle housing 325.

The lens 321 is provided at a light receiving surface side of a light detection unit 42. The lens 321 collects the light signal emitted from the plug 31 to the light receiving surface of the light detection unit 42.

In the receptacle housing 325, a fitting hole 325a is provided on a surface that faces the plug 31 when the plug 31 and the receptacle 32 are connected. The fitting hole 325a has a shape and a size corresponding to the fitting protrusion portion 315a of the plug housing 315, and the fitting protrusion portion of the plug housing 315 is inserted at the time of connection of the plug 31 and the receptacle 32.

In the inner portion of the fitting hole 325a, a contact portion 325d is formed at a position that faces the engagement portion 312a of the lens retention portion 312, when the fitting protrusion portion of the plug 31 is positioned in the fitting hole 325a. The contact portion 325d contacts with the engagement portion 312a of the lens retention portion 312, when the plug 31 and the receptacle 32 are connected by inserting the fitting protrusion portion of the plug 31 into the fitting hole 325a. Thus, when the plug 31 is further inserted in a state in which the engagement portion 312a of the lens retention portion 312 contacts with the contact portion 325d, the lens retention portion 312 attached to the support shaft 315c is moved in the opposite direction to the emission direction of the light signal (the pressing direction of the pressing portion 313a).

The receptacle attachment portion 326 mechanically and electrically connects the receptacle 32 to a reception side substrate 327. For example, the receptacle attachment portion 326 electrically connects the receptacle 32 to the reception side substrate 327, and inputs a signal generated by the light detection unit 42 into a circuit of the reception side substrate 327. Also, the receptacle attachment portion 326 mechanically connects the receptacle 32 to the reception side substrate 327, and fixes the receptacle housing 325 at a predetermined position of the reception side substrate 327.

<3-2. Operation of First Embodiment>

In the optical connector configured as described above, an attenuation amount of light intensity according to distance is small, when the light signal (the laser light) from the plug 31 connected to the receptacle 32 of the sink device 14 is the collimated light, for example. Hence, it is possible that the emitted light from the plug 31 enters into an eyeball of a person and gives a bad influence to a visual perception function or the like, even if away from the plug 31. Thus, when the plug 31 is not connected to the receptacle 32, the collimator lens 311 is set at an unconnected position, to convert the light signal emitted via the collimator lens 311 to a non-collimated light that has a predetermined divergence angle. As described above, the light signal is set to a predetermined divergence angle, and thereby the light amount of a predetermined region at a position away by a predetermined distance is set equal to or smaller than a light amount stipulated in advance. Also, when the plug 31 is connected to the receptacle 32, the collimator lens 311 is set at a connection position, and the light signal emitted to the receptacle 32 via the collimator lens 311 of the plug 31 is converted to the collimated light.

Figure 4A:
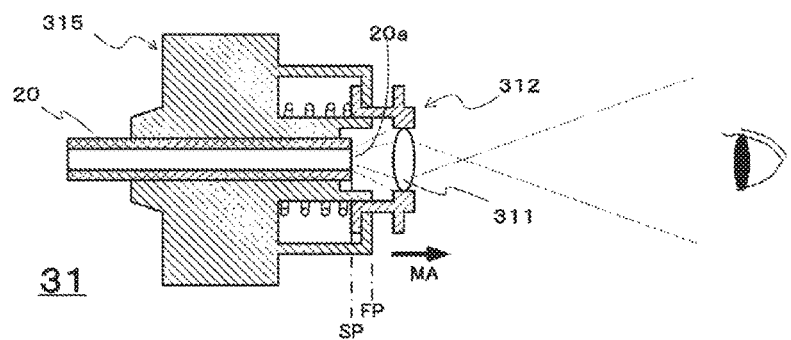
FIG. 4A is a diagram illustrating a state that an eye views a light signal emitted from a plug.
Figure 4B:
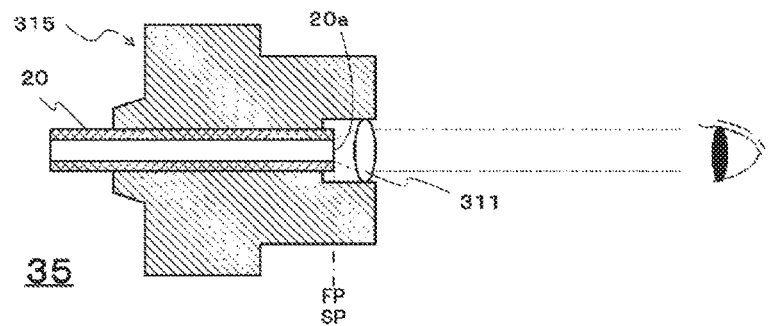
FIG. 4B is another diagram illustrating a state that an eye views a light signal emitted from a plug.

FIGS. 4A and 4B illustrate a state that an eye views the light signal emitted from the plug. FIG. 4A illustrates a case in which the collimator lens 311 is at an unconnected position, and the light signal from the emission surface 20a of the optical fiber cable 20 is converted to a predetermined divergence angle by the collimator lens 311. Note that, in FIG. 4A, a position at which a focal point position FP of the collimator lens 311 is away in the emission direction of the light signal from the position SP of the emission surface 20a of the optical fiber cable 20 is an unconnected position.

FIG. 4B illustrates a configuration of the plug 35 of the past in which the light signal from the emission surface 20a of the optical fiber cable 20 is converted to the collimated light by the collimator lens 311. In this case, the collimator lens 311 is fixed to the plug 31 with identically positioned focal point position FP and position SP of the emission surface 20a of the optical fiber cable 20.

As illustrated in FIG. 4B, in the plug 35 of the configuration of the past, the collimated light is output regardless of whether or not connected to the receptacle. Hence, when the emitted light of the plug 31 is viewed with eyes at a position away from the plug 31, it is concerned that the light amount that enters into the eye is large and gives a bad influence to the visual perception function or the like.

However, as illustrated in FIG. 4A, when the plug and the receptacle are not connected, the collimator lens 311 retained by the lens retention portion 312 is driven by the pressing portion 313a to an unconnected position, and the light signal from the emission surface 20a of the optical fiber cable 20 is converted to a predetermined divergence angle by the collimator lens 311. Hence, when the emitted light of the plug 31 is viewed with the eye at the position away from the plug 31, the emitted light is dispersed, and thus the light amount that enters into the eye becomes small, and is prevented from giving the bad influence to the visual perception function or the like.

Also, in the device that uses the laser light, a light beam that exceeds a certain light intensity must be prevented from entering into an eye of a person directly, from the safety aspect. For example, in the standard of IEC60825-1/JIS C 6802, it is stipulated to limit the light amount that enters into diameter 7 mm corresponding to a pupil of a person at a distance 70 mm away from the light source. Thus, a predetermined divergence angle is an angle at which a light amount of a predetermined region at a position away from the collimator lens 311 by a predetermined distance is equal to or smaller than a preset light amount for example, in order to satisfy this standard or the like.

Figure 5A:
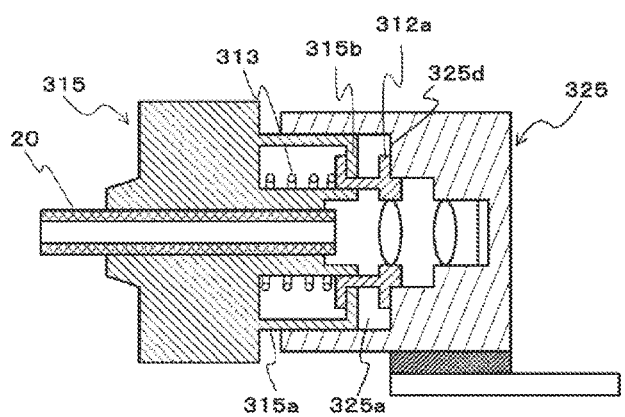
FIG. 5A is a diagram illustrating a connection between a plug and a receptacle.
Figure 5B:
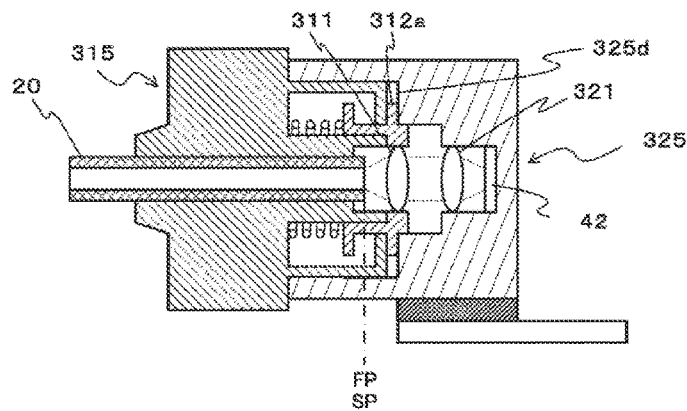
FIG. 5B is another diagram illustrating a connection between a plug and a receptacle.

FIGS. 5A AND 5B illustrate connection of the plug and the receptacle. FIG. 5A illustrates a state in the middle of connection, and FIG. 5B illustrates a connection completed state.

The fitting protrusion portion 315a of the plug 31 and the fitting hole 325a of the receptacle 32 are brought face to face, and the fitting protrusion portion 315a is inserted into the fitting hole 325a, and thereby the engagement portion 312a in the plug 31 contacts with the contact portion 325d of the receptacle 32, like FIG. 5A. Further, when the plug 31 is inserted into the receptacle 32, the lens retention portion 312 of the plug 31 moves in the opposite direction (the direction of the plug housing 315 of the plug 31) to the pressing direction by the pressing portion 313a, along with the insertion of the plug 31. That is, the collimator lens 311 moves in the direction of the connection position from the unconnected position.

When the connection of the plug 31 and the receptacle 32 is completed, as illustrated in FIG. 5B, the movement of the lens retention portion 312 of the plug 31 is completed, and the collimator lens 311 is at a connection position. In this case, the focal point position FP of the collimator lens 311 is at a position identical with the position SP of the emission surface 20a of the optical fiber cable 20. Thus, the light emitted to the receptacle 32 from the plug 31 becomes a collimated light.

Also, when the plug 31 is detached from the receptacle 32, the fitting protrusion portion 315a of the plug 31 is pulled out from the fitting hole 325a of the receptacle 32. In this case, the lens retention portion 312 is pressed by the pressing portion 313a, and thus the collimator lens 311 retained by the lens retention portion 312 is driven to the unconnected position from the connection position by the pressing portion 313a.

In the optical connector configured as described above, the light signal emitted from the laser light source of the source device is led to the optical connector of the source device side and the optical fiber cable and the light detection unit of the sink device side, in order to perform the optical communication between the source device and the sink device. Here, when the light signal output from the receptacle of the optical connector of the source device side and the plug provided at the end portion of the optical fiber cable is the collimated light, the attenuation amount of the light intensity according to distance is small, and thus the light amount is large even at a position away by a predetermined distance or more. However, according to the first embodiment, the collimator lens is at an unconnected position when the optical connector is unconnected, and the light signal is emitted from the plug 31 as a signal that has a predetermined divergence angle, and therefore the bad influence on the visual perception function or the like is prevented. Also, the collimator lens is at the connection position at the time of the connection of the optical connector, and the light signal is emitted to the receptacle 32 from the plug 31 as the collimated light, and therefore robust optical communication can be performed between the plug 31 and the receptacle 32. Note that the effect obtained by the first embodiment of the optical connector is illustration and is not limited to the above effect, and other effects may be obtained.

<4. Second Embodiment of Optical Connector>
<4-1. Schematic Configuration of Second Embodiment>

In the second embodiment of the optical connector, a case in which the collimator lens provided in the plug of the light signal transmission side can turn in the emission direction of the light signal about a center at the axis provided at the side end side of the collimator lens will be described.

Figure 6:
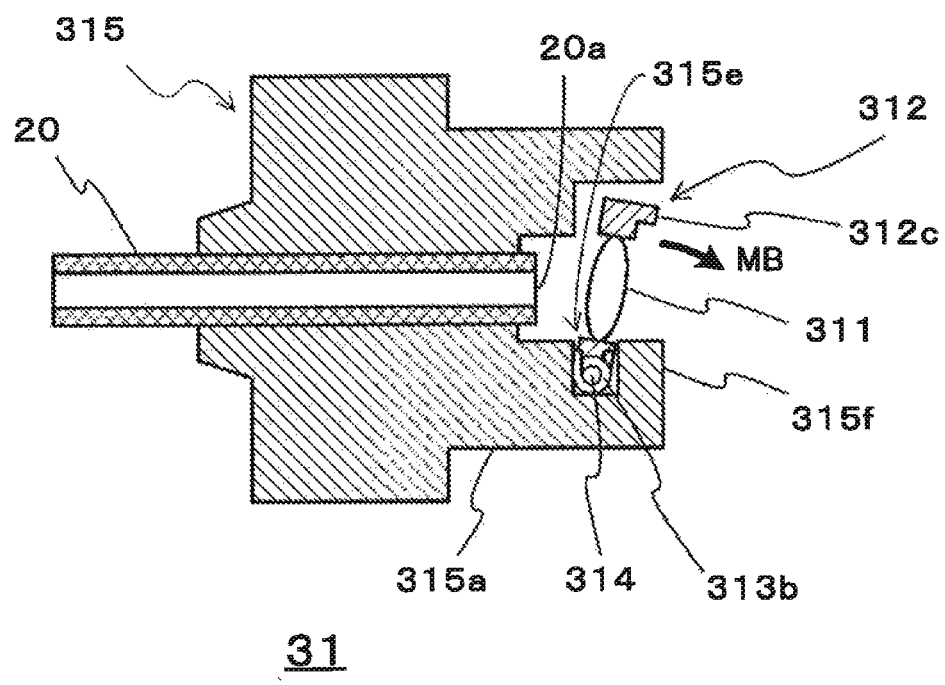
FIG. 6 is a diagram illustrating a schematic configuration of a plug that emits a light signal.
Figure 7:
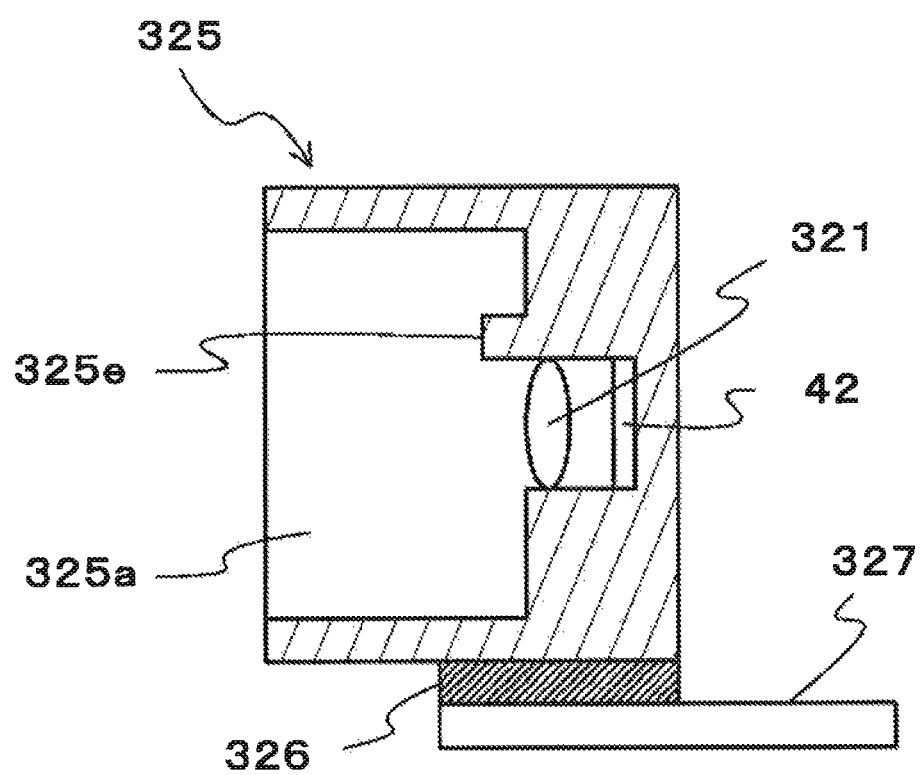
FIG. 7 is a diagram illustrating a schematic configuration of a receptacle into which a light signal enters.

FIG. 6 illustrates a schematic configuration of a plug that emits a light signal. Also, FIG. 7 illustrates a schematic configuration of a receptacle into which the light signal enters.

As illustrated in FIG. 6, the plug (the transmission side optical connector) 31 that emits the light signal includes the collimator lens 311, the lens retention portion 312, the pressing portion 313b, and the plug housing 315.

The collimator lens 311 is provided at the emission surface 20a side of the optical fiber cable 20, and converts the light signal emitted from the optical fiber cable 20 to a collimated light.

The lens retention portion 312 retains the collimator lens 311. The lens retention portion 312 has a ring shape for example, and the collimator lens 311 is fixed to the center part. The engagement portion 312c is formed at an outer surface side of the lens retention portion 312. A shaft hole (not illustrated in the drawings) is formed at a side end of an opposite side of the position at which the engagement portion 312c of the lens retention portion 312 is provided, and a shaft 314 described later is inserted therethrough.

The pressing portion 313b presses the lens retention portion 312 in an arrow MB direction in such a manner that the lens retention portion 312 turns in the emission direction of the light signal.

The pressing portion 313b is configured by using a torsional spring or the like for example, and one end of the spring is latched on the lens retention portion 312, and another end is latched on the plug housing 315, respectively. The pressing portion 313b presses the lens retention portion 312 in the arrow MB direction in such a manner that the lens retention portion 312 turns in the emission direction of the light signal about a center at the shaft 314.

The shaft 314 is provided in a recessed portion 315e of the plug housing 315 described later. The shaft 314 is inserted into the shaft hole of the lens retention portion 312, and retains the lens retention portion 312 in a turnable manner.

The plug housing 315 retains the optical fiber cable 20, and retains the lens retention portion 312 in a turnable manner in the optical axis direction of the light signal. In the plug housing 315, the fitting protrusion portion 315a is provided to protrude on the facing surface to the receptacle 32 when the plug 31 and the receptacle 32 are connected. The fitting protrusion portion 315a has a shape and a size corresponding to the fitting hole of the receptacle 32, and is inserted into the fitting hole of the receptacle 32 when the plug 31 and the receptacle 32 are connected.

At a distal end side of the fitting protrusion portion 315a, the recessed portion 315e for retaining the lens retention portion 312 in a turnable manner is provided, and the wall surface of the distal end side of the recessed portion 315e is a restriction portion 315f that restricts turning of the lens retention portion 312.

As illustrated in FIG. 7, the receptacle (the reception side optical connector) 32 into which the light signal enters includes the lens 321 and the receptacle housing 325, and the receptacle attachment portion 326, and the light detection unit 42.

The lens 321 is provided at a light receiving surface side of a light detection unit 42. The lens 321 collects the light signal emitted from the plug 31 to the light receiving surface of the light detection unit 42.

In the receptacle housing 325, a fitting hole 325a is provided on a surface that faces the plug 31 when the plug 31 and the receptacle 32 are connected. The fitting hole 325a has a shape and a size corresponding to the fitting protrusion portion 315a of the plug housing 315, and the fitting protrusion portion 315a of the plug housing 315 is inserted at the time of connection of the plug 31 and the receptacle 32.

In the fitting hole 325a, a contact portion 325e is formed at a position that faces the engagement portion 312c of the lens retention portion 312, when the fitting protrusion portion 315a of the plug 31 is at the position of the fitting hole 325a of the receptacle 32. The contact portion 325e contacts with the engagement portion 312c of the lens retention portion 312, when the fitting protrusion portion 315a of the plug 31 is inserted in the fitting hole 325a of the receptacle 32 in order to connect the plug 31 and the receptacle 32. As described above, when the contact portion 325e contacts with the engagement portion 312c, the lens retention portion 312 attached to the shaft 314 is turned in the opposite direction to the emission direction of the light signal (the pressing direction of the pressing portion 313b).

The receptacle attachment portion 326 mechanically and electrically connects the receptacle 32 to a reception side substrate 327. For example, the receptacle attachment portion 326 electrically connects the receptacle 32 to the reception side substrate 327, and inputs a signal generated by the light detection unit 42 into a circuit of the reception side substrate 327. Also, the receptacle attachment portion 326 mechanically connects the receptacle 32 to the reception side substrate 327, and fixes the receptacle housing 325 at a predetermined position of the reception side substrate 327.

<4-2. Operation of Second Embodiment>

In the optical connector configured as described above, an attenuation amount of light intensity according to distance is small, when the light signal (the laser light) from the plug 31 connected to the receptacle 32 of the sink device 14 is the collimated light, for example. Hence, it is possible that the emitted light from the plug 31 enters into an eyeball of a person and gives a bad influence to a visual perception function or the like, even if away from the plug 31. Thus, when the plug 31 is not connected to the receptacle 32, the collimator lens 311 is set at an unconnected position, to convert the light signal emitted via the collimator lens 311 to a non-collimated light that has a predetermined divergence angle. As described above, the light signal is set to a predetermined divergence angle, and thereby the light amount of a predetermined region at a position away by a predetermined distance is set equal to or smaller than a light amount stipulated in advance. Also, when the plug 31 is connected to the receptacle 32, the collimator lens 311 is set at a connection position, and the light signal emitted to the receptacle 32 via the collimator lens 311 of the plug 31 is converted to the collimated light.

Figure 8:
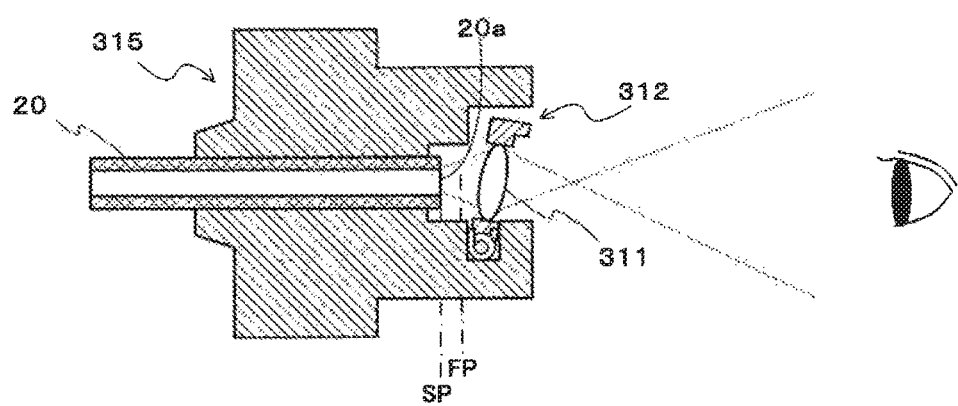
FIG. 8 is a diagram illustrating a state that an eye views a light signal emitted from a plug.

FIG. 8 illustrates a state in which an eye views the light signal emitted from the plug, and illustrates a case in which the collimator lens is at an unconnected position, and the light signal from the emission surface 20a of the optical fiber cable 20 is converted to a predetermined divergence angle by the collimator lens 311. Note that, in FIG. 8, the collimator lens 311 turns by the pressing force of the pressing portion 313b, and the position at which the focal point position FP is away in the emission direction of the light signal from the position SP of the emission surface 20a of the optical fiber cable 20 is at an unconnected position.

As illustrated in FIG. 8, when not connected to the receptacle, the collimator lens 311 retained by the lens retention portion 312 is driven by the pressing portion 313b to the unconnected position. Hence, the light signal from the emission surface 20a of the optical fiber cable 20 is converted to a predetermined divergence angle by the collimator lens 311. Thus, when the emitted light of the plug 31 is viewed with the eye at a position away from the plug 31, the emitted light is dispersed, and thus the light amount that enters into the eye becomes smaller, and the bad influence is prevented.

Figure 9A:
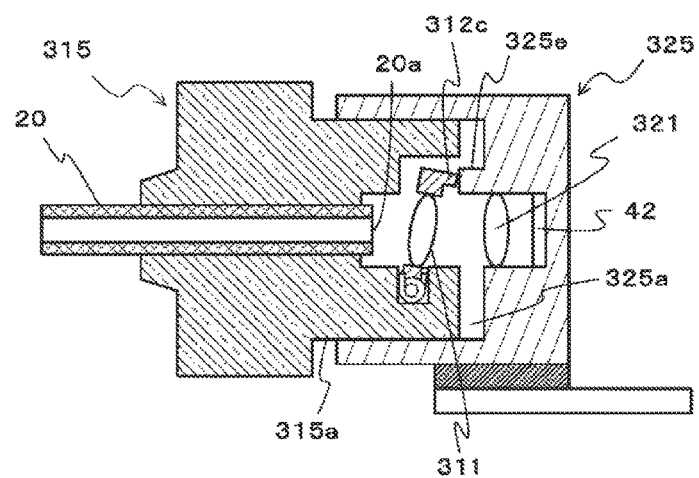
FIG. 9A is a diagram illustrating a connection between a plug and a receptacle.
Figure 9B:
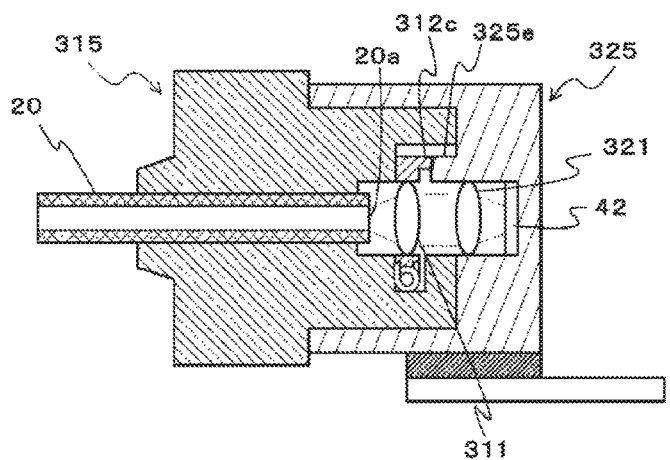
FIG. 9B is another diagram illustrating a connection between a plug and a receptacle.

FIGS. 9A and 9B illustrate connection of the plug and the receptacle. FIG. 9A illustrates a state in the middle of connection, and FIG. 9B illustrates a connection completed state.

The fitting protrusion portion 315a of the plug 31 and the fitting hole 325a of the receptacle 32 are brought face to face, and the fitting protrusion portion 315a is inserted into the fitting hole 325a, and thereby the engagement portion 312c in the plug 31 contacts with the contact portion 325e of the receptacle 32, like FIG. 9A. Further, when the plug 31 is inserted into the receptacle 32, the lens retention portion 312 of the plug 31 turns in the opposite direction (the direction of the plug housing 315 of the plug 31) to the pressing direction by the pressing portion 313b, along with the insertion of the plug 31. That is, the collimator lens 311 moves in the direction of the connection position from the unconnected position.

When the connection of the plug 31 and the receptacle 32 is completed, the turning of the lens retention portion 312 of the plug 31 ends, and the collimator lens 311 is at the connection position, as illustrated in FIG. 9B. Thus, the light emitted to the receptacle 32 from the plug 31 is a collimated light.

Note that, when the plug 31 is detached from the receptacle 32, the fitting protrusion portion 315a of the plug 31 is pulled out from the fitting hole 325a of the receptacle 32. In this case, the lens retention portion 312 is pressed by the pressing portion 313b, and thereby the collimator lens 311 turns to the unconnected position.

According to the optical connector of the second embodiment configured as described above, the collimator lens is at the unconnected position when the optical connector is unconnected, and the light signal is emitted from the plug 31 as a signal that has a predetermined divergence angle, in the same way as the first embodiment. As described above, the light signal is emitted from the plug 31 as the signal that has the predetermined divergence angle, and therefore the bad influence to the visual perception function or the like is prevented. Also, the collimator lens is at the connection position at the time of connection of the optical connector, and the light signal is emitted to the receptacle 32 from the plug 31 as the collimated light, and therefore the robust optical communication can be performed between the plug 31 and the receptacle 32. Note that the effect obtained by the second embodiment of the optical connector is illustration and is not limited to the above effect, but other effects may be obtained.

<5. Another Configuration and Operation of Optical Connector>

Also, in above first and second embodiments, a case in which the lens retention portion 312 of the plug 31 is at an unconnected position, and the light signal from the optical fiber cable 20 is converted to the light of a predetermined divergence angle and emitted from the plug 31 has been described. However, conversion to the light of the predetermined divergence angle is not limited to the plug 31, but may be performed by the receptacle 32. For example, the lens 321 of the receptacle 32 provided in the transmitter device of the light signal may be moved as described above, to emit and convert the light signal from the light source to a predetermined divergence angle when the plug 31 is not connected.

As described above, when the receptacle 32 provided in the transmission side device of the light signal emits and converts the light signal to the signal that has the predetermined divergence angle, the light signal emitted in a state in which the optical fiber cable 20 is not connected is prevented from giving the bad influence to the visual perception function or the like.

Also, the optical connectors of the first and second embodiments are configured to move the collimator lens in the emission direction of the light signal in order to have a predetermined divergence angle, in a state in which the plug 31 and the receptacle 32 are unconnected, in the illustrates case. However, the optical connector may be configured to have a predetermined divergence angle by moving the collimator lens in the opposite direction to the emission direction of the light signal.

Figure 10A:
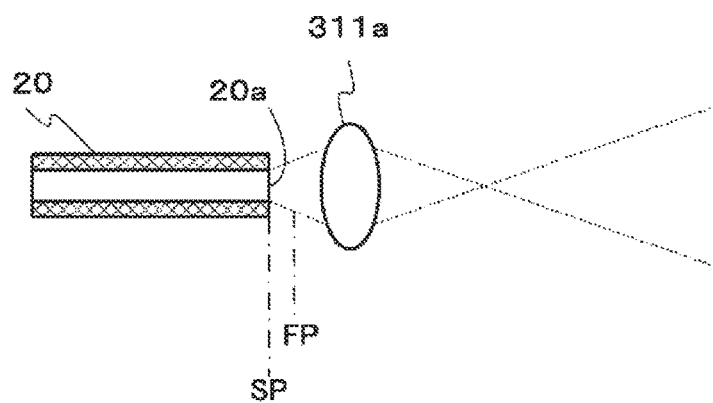
FIG. 10A is a diagram illustrating a case in which a variable focus lens is used as a collimator lens.
Figure 10B:
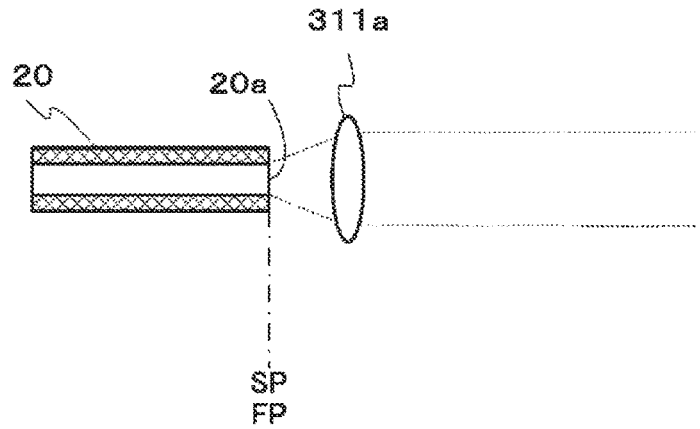
FIG. 10B is another diagram illustrating a case in which a variable focus lens is used as a collimator lens.

Also, the first and second embodiments, have illustrated a case in which the collimator lens is moved to convert the light signal to the light of a predetermined divergence angle to output the light signal, when the plug 31 and the receptacle 32 are in an unconnected state. However, the process that converts the light signal to the light of the predetermined divergence angle is not limited to the movement of the collimator lens. For example, a variable focus lenses 311a is used as the collimator lens, and when the plug 31 and the receptacle 32 are in an unconnected state, the light signal is made to have a focal length of a predetermined divergence angle, as illustrated in FIG. 10A. For example, the lens drive unit (not illustrated in the drawings) drives the variable focus lens 311a in such a manner that the focal point position FP becomes closer to the lens side than the position SP of the emission surface 20a of the light signal. Also, when the plug 31 and the receptacle 32 are in a connected state, the variable focus lenses 311a is driven to have a focal length at which the light signal becomes a collimated light, for example, such that the position SP of the emission surface 20a of the light signal becomes identical with the focal point position FP, as illustrated in FIG. 10B. In this way, the divergence angle of the light signal is switched, without moving the collimator lens.

Further, in the first and second embodiments, a case in which the emission surface of the light signal and the light receiving surface of the light detection unit are located at positions on a straight line when the plug 31 and the receptacle 32 are connected has been illustrated, a direction conversion member such as a mirror may be provided on the light path of the light signal. In this case, the collimated light or the light signal that has a divergence angle may be set in an arbitrary direction, and therefore the degree of freedom such as shape and location of the plug 31 and the receptacle 32 can be increased. Also, the above effect is not a limitation, but other effects may be obtained.

Also, the optical connector provided with the lens that emits and converts the light signal to a predetermined divergence angle may be separately provided from the optical fiber cable, and may be provided as an optical fiber cable into which the optical connector is integrated.

Note that the present technology should not be interpreted as being limited to the embodiments of the above technology. The embodiments of this technology disclose the present technology in a form of illustration, and it is obvious that a skilled person can achieve modification and substitution of the embodiments within a scope that does not depart from the spirit of the present technology. That is, the claims should be referred to determine the scope of the present technology.

Further, the optical connector according to the present technology can also be configured as follows.

(1)

An optical connector including:

a collimator lens for emitting by converting a light signal from a light transmission path or a light source to a collimated light;

a housing configured to retain the collimator lens and be coupled to a reception side optical connector of the light signal; and a lens drive unit configured to drive the collimator lens in such a manner that a light signal emitted via the collimator lens has a predetermined divergence angle, when the housing is not coupled to the reception side optical connector.

(2)

The optical connector according to (1), wherein the lens drive unit includes a lens retention portion that is movable in a state retaining the collimator lens, and a pressing portion configured to press the lens retention portion in a direction of a position at which the light signal emitted via the collimator lens has a divergence angle.

(3) The optical connector according to (2), wherein the lens retention portion moves to a position at which the light signal emitted via the collimator lens becomes a collimated light, when the reception side optical connector is coupled to a predetermined position.

(4) The optical connector according to (2) or (3), wherein the lens retention portion moves in an optical axis direction of the collimator lens.

(5) The optical connector according to (2) or (3), wherein the lens retention portion turns about a center at a shaft provided at a side end side of the collimator lens in an orthogonal direction to an optical axis of the collimator lens.

(6) The optical connector according to (1), wherein the lens drive unit changes a focal length of the collimator lens in such a manner that the light signal emitted via the collimator lens has a divergence angle.

(7) The optical connector according to any one of (1) to (6), wherein the predetermined divergence angle is an angle at which a light amount of a predetermined region at a position a predetermined distance away from the collimator lens is equal to or smaller than a preset light amount.

INDUSTRIAL APPLICABILITY

According to the optical connector, the cable, and the optical communication device of this technology, the collimator lens for emitting and converting the light signal from the light transmission path or the light source to the collimated light is retained in the housing that is coupled to the reception side optical connector of the light signal. Also, when the housing is not coupled to the reception side optical connector, the lens drive unit drives the collimator lens in such a manner that the light signal emitted via the collimator lens has a predetermined divergence angle. Hence, when the optical connectors of the transmission side and the reception side are not connected, the light signal emitted from the optical connector of the transmission side is dispersed, and therefore emission of the light signal which gives the bad influence to the visual perception function or the like is prevented. Thus, this technology is suited for a system that uses a communication device or an electronic device that performs communication of video information, audio information, various types of data, and the like, via a light transmission path such as an optical fiber cable.

REFERENCE SIGNS LIST 10 optical communication system
12 source device
14 sink device
20 optical fiber cable
20a emission surface
31,35 plug
32, 32-a, 32-b receptacle
41 light source
42 light detection unit
311 collimator lens
311a variable focus lens
312 lens retention portion
312a, 312c engagement portion
312b latch portion
313a, 313b pressing portion
314 shaft
315 plug housing
315a fitting protrusion portion
315b, 315f restriction portion
315c support shaft
315e recessed portion
321 lens
325 receptacle housing
325a fitting hole
325d, 325e contact portion
326 receptacle attachment portion
327 reception side substrate

The invention claimed is:

1. An optical connector comprising:
a collimator lens for emitting by converting a light signal from a light transmission path or a light source to a collimated light;
a housing configured to retain the collimator lens and be coupled to a reception side optical connector of the light signal; and
a lens drive unit configured to drive the collimator lens in such a manner that a light signal emitted via the collimator lens has a predetermined divergence angle, when the housing is not coupled to the reception side optical connector,
wherein the lens drive unit includes
a lens retention portion that is movable in a state retaining the collimator lens, and
a pressing portion configured to press the lens retention portion in a direction of a position at which the light signal emitted via the collimator lens has a divergence angle, and
wherein the lens retention portion turns about a center at a shaft provided at a side end side of the collimator lens in an orthogonal direction to an optical axis of the collimator lens.

2. The optical connector according to claim 1, wherein the lens retention portion moves to a position at which the light signal emitted via the collimator lens becomes a collimated light, when the reception side optical connector is coupled to a predetermined position.

3. The optical connector according to claim 1, wherein the lens retention portion moves in an optical axis direction of the collimator lens.

4. The optical connector according to claim 1, wherein the lens drive unit changes a focal length of the collimator lens in such a manner that the light signal emitted via the collimator lens has a divergence angle.

5. The optical connector according to claim 1, wherein the predetermined divergence angle is an angle at which a light amount of a predetermined region at a position a predetermined distance away from the collimator lens is equal to or smaller than a preset light amount.

6. A cable comprising:
a collimator lens for emitting by converting a light signal from an end surface of an optical fiber cable to a collimated light;
a housing configured to retain the optical fiber cable and the collimator lens and coupled to a reception side optical connector of the light signal; and
a lens drive unit configured to drive the collimator lens in such a manner that a light signal emitted via the collimator lens has a predetermined divergence angle, when the housing is not coupled to the reception side optical connector, wherein the lens drive unit includes
- a lens retention portion that is movable in a state retaining the collimator lens, and
- a pressing portion configured to press the lens retention portion in a direction of a position at which the light signal emitted via the collimator lens has a divergence angle, and wherein the lens retention portion turns about a center at a shaft provided at a side end side of the collimator lens in an orthogonal direction to an optical axis of the collimator lens.

7. A light communication device comprising:

a light signal output unit;

a collimator lens for emitting by converting a light signal from the light signal output unit to a collimated light;

a housing configured to retain the collimator lens and be coupled to a reception side optical connector of the light signal; and a lens drive unit configured to drive the collimator lens in such a manner that a light signal emitted via the collimator lens has a predetermined divergence angle, when the housing is not coupled to the reception side optical connector, wherein the lens drive unit includes
- a lens retention portion that is movable in a state retaining the collimator lens, and
- a pressing portion configured to press the lens retention portion in a direction of a position at which the light signal emitted via the collimator lens has a divergence angle, and wherein the lens retention portion turns about a center at a shaft provided at a side end side of the collimator lens in an orthogonal direction to an optical axis of the collimator lens.

* * * * *